US012596840B1

(12) United States Patent
Tummalapalli et al.

(10) Patent No.: US 12,596,840 B1
(45) Date of Patent: Apr. 7, 2026

(54) SYSTEM AND METHOD FOR SECURELY DISPOSING DATA ASSOCIATED WITH INACTIVE ACCOUNTS

(71) Applicant: Morgan Stanley Services Group Inc., New York, NY (US)

(72) Inventors: Mohan Kumar Tummalapalli, Bridgewater, NJ (US); Nand Kishore Jayswal, Alpharetta, GA (US); Nidhi A. Jaiswal, Bangalore (IN); Sumit Khairnar, Kothrud Pune (IN); Raju Ravindran, River Vale, NJ (US); Madonna Florendo, Morganville, NJ (US); Arnold DeRama, Jersey City, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/312,740

(22) Filed: Aug. 28, 2025

(51) Int. Cl.
  *G06F 21/62* (2013.01)
  *G06F 16/11* (2019.01)

(52) U.S. Cl.
  CPC ........ *G06F 21/6245* (2013.01); *G06F 16/125* (2019.01)

(58) Field of Classification Search
  CPC ........................... G06F 21/6245; G06F 16/125
  USPC ......................................................... 726/26
  See application file for complete search history.

(56) References Cited

U.S. PATENT DOCUMENTS

| | | | |
|---|---|---|---|
| 5,813,009 A | 9/1998 | Johnson et al. | |
| 6,185,576 B1 | 2/2001 | McIntosh | |
| 8,271,451 B2 | 9/2012 | Steffan | |
| 10,706,026 B1 * | 7/2020 | Hansen | ................. G06F 16/215 |
| 12,423,282 B1 * | 9/2025 | Medikurthi | ....... G06F 16/24566 |
| 2004/0088313 A1 | 5/2004 | Torres | |
| 2014/0082749 A1 * | 3/2014 | Holland | ................. G06F 21/60 |
| | | | 726/29 |
| 2014/0351201 A1 * | 11/2014 | Hobart | ................. G06F 16/125 |
| | | | 707/603 |
| 2015/0347548 A1 | 12/2015 | Mortensen et al. | |
| 2018/0074873 A1 * | 3/2018 | Iqbal | ................... G06F 11/1471 |

(Continued)

OTHER PUBLICATIONS

Peiyu Liu; How IoT Re-using Threatens Your Sensitive Data: Exploring the User-Data Disposal in Used IoT Devices; IEEE: 2023; pp. 3365-3381.*

*Primary Examiner* — Monjur Rahim
(74) *Attorney, Agent, or Firm* — Leason Ellis LLP

(57) ABSTRACT

A system and method for identifying purge eligible data objects; generating a final purge list based on the purge eligible data objects in an iterative or recursive manner until a combined key file contains no partial shares, including: obtaining relational information associated with the purge eligible data objects; identifying related data objects based on the relational information; identifying purge exemptions associated with the purge eligible data objects; generating the combined key file for the relations associated to each purge eligible object; in response to the combined key file not containing a partial share, generating the final purge list based on the combined key file; identifying account keys from in-scope tables maintained at the computing systems; loading purge keys in a driver table based on the account keys; and joining the in-scope tables maintained at the computing systems with the driver table to purge records of the in-scope tables.

20 Claims, 7 Drawing Sheets

(56)                    References Cited

U.S. PATENT DOCUMENTS

| | | |
|---|---|---|
| 2018/0075138 A1 | 3/2018 | Perram et al. |
| 2019/0294707 A1 | 9/2019 | Ramaswamy et al. |
| 2021/0286684 A1 | 9/2021 | Nara |
| 2022/0012134 A1 | 1/2022 | Chatterjee et al. |
| 2023/0020330 A1 | 1/2023 | Schwerin et al. |
| 2023/0147671 A1* | 5/2023 | Narulkar ................. G06F 21/79 |
| | | 707/692 |
| 2023/0409441 A1 | 12/2023 | Sharma et al. |
| 2025/0117371 A1* | 4/2025 | Li ......................... G06F 16/125 |

* cited by examiner

100

200

300a

300b

5/7 s501: Generate Rollback Object List s502: Identify Rollback Key(s)

s503: Extract Archive Data Using Rollback Key(s)

s504: Merge Table Files s505: Obtain Pre-Rollback Image Copy(ies) Table(s)

s506: Execute Rollback of Rollback Object(s) on Main Table(s)

s507: Obtain Post-Rollback Image Copy(ies) Table(s)

s508: Reconcile with Pre-Purge Information end

500

600

SYSTEM AND METHOD FOR SECURELY DISPOSING DATA ASSOCIATED WITH INACTIVE ACCOUNTS

FIELD

The present disclosure generally relates to a computer records management system and, more specifically, to a system and method for effectively and securely disposing stale data in a large computer network system.

BACKGROUND

For enterprises that operate in different jurisdictions across industries and that keep records of sensitive information, for example, client information, personal identifiable information (PII), business information, banking information, or other confidential information, to name a few, secure record keeping is essential. However, maintaining such a system can be cumbersome and resource draining. Additionally, keeping such records in perpetuity can require exorbitant resources for maintenance and affect system performance, while providing no benefits to such enterprises for keeping stale records and data.

SUMMARY

In view of the foregoing, there is a need for a way to accurately and securely dispose of stale data that is no longer needed to be kept in a computer records system. However, especially for larger enterprises, there are potentially large numbers of different policies for data retention, for example, across multiple operating departments, industries, jurisdictions, to name a few. As such, there is a need for a system that can effectively dispose of stale data while being fully compatible with different services, compliance standards, data retention policies, tax record requirements, legal requirements, business rules, international rules and standards, or the like.

The present disclosure generally relates to computer records management systems and, more specifically, provides a multi-stage stale data disposition technique that optimizes resources directed to records retention while fully complying with varying requirements for such records retention.

According to one or more exemplary implementations of the present disclosure, a system, comprises: a network interface; a processor; and a memory operatively connected to the processor and having stored thereon machine-readable instructions that, when executed, cause the processor to: identify one or more purge eligible data objects: generate a final purge list based on the one or more purge eligible data objects in an iterative or recursive manner until a combined key file associating relations to the one or more purge eligible data objects contains no partial shares, said generating comprising: obtaining relational information associated with the one or more purge eligible data objects; identifying one or more related data objects based on the relational information; identifying one or more purge exemptions associated with the one or more purge eligible data objects by forwarding, via the network interface, a purge preview to one or more computing systems and receiving identification for the one or more purge exemptions from the one or more computing systems via the network interface: generating the combined key file for one or more of the relations associated to each purge eligible object; determining whether the combined key file contains a partial share: in response to determining that the combined key file contains at least one partial share, repeating the obtaining, the identifying of related data objects, the identifying of purge exemptions, and the generating; in response to determining that the combined key file does not contain a partial share, generating the final purge list based on the combined key file; identify, based on the final purge list, one or more account keys from one or more in-scope tables maintained at the one or more computing systems: load one or more purge keys in a driver table based on the one or more account keys; and join the one or more in-scope tables maintained at the one or more computing systems with the driver table to purge one or more records of the one or more in-scope tables.

In one or more exemplary implementations, the memory has stored thereon additional machine-readable instructions that, when executed, cause the processor to: archive the purged one or more records of the one or more in-scope tables in a purge archive; load purge keys in a driver history table; determine whether the purge of the one or more records of the one or more in-scope tables is valid: in response to determining that the purge of the one or more records of the one or more in-scope tables is valid, permanently delete the purged one or more records from the purge archive; and in response to determining that the purge of the one or more records of the one or more in-scope tables is invalid, execute a rollback of the purged one or more records to the one or more in-scope tables.

In one or more exemplary implementations, the permanently deleting of the purged one or more records from the purge archive is executed based on the driver history table in a process in a process that corresponds to the joining.

In one or more exemplary implementations, the rollback is executed based on the driver history table and the purge archive, and the rollback comprises: generating a rollback object list; identifying one or more rollback keys; extracting data from the purge archive using the one or more rollback keys; merging the extracted archive data to one or more rollback tables; obtaining one or more pre-rollback image copies of the one or more in-scope tables; restoring one or more rollback objects to the one or more in-scope tables; obtaining one or more post-rollback image copies of the one or more in-scope tables; and reconciling rolled back data based on pre-purge information.

In one or more exemplary implementations, the pre-purge information comprises a pre-purge table count, a post-purge table count, and a table count difference between before and after the rollback.

In one or more exemplary implementations, the determining is based on reconciliation data received from the one or more computing systems, the reconciliation data being associated with the purged one or more records of the one or more in-scope tables.

In one or more exemplary implementations, the reconciliation data is triggered to be generated at the one or more computing systems in response to the joining.

In one or more exemplary implementations, the reconciliation data comprises aggregated reconciliation information from respective applications executed at the one or more computing systems.

In one or more exemplary implementations, the determining is executed based on one or more legal hold and retention period criteria for the purged one or more records of the one or more in-scope tables.

In one or more exemplary implementations, the joining comprises, for each of the one or more in-scope tables maintained at the one or more computing systems: an iterative or recursive process that is executed until an end-of-row is determined for a cursor at an input table, said iterative or recursive process comprising: obtaining an identification of the input table; opening the cursor declared with row-set positioning to select one or more records from the input table based on the obtained identification and in accordance with joining to the driver table; fetching the cursor based on a row-set frequency; deleting one or more rows from the input table at a current position of the fetched cursor; performing a commit process on the deleting at the input table; preparing one or more deleted records; and writing the prepared one or more deleted records to one or more backup files; and generating a purge report.

According to one or more exemplary implementations of the present disclosure, a method, comprises: identifying, at a computing apparatus, one or more purge eligible data objects; generating, at the computing apparatus, a final purge list based on the one or more purge eligible data objects in an iterative or recursive manner until a combined key file associating relations to the one or more purge eligible data objects contains no partial shares, said generating comprising: obtaining relational information associated with the one or more purge eligible data objects; identifying one or more related data objects based on the relational information; identifying one or more purge exemptions associated with the one or more purge eligible data objects by forwarding, via a network interface, a purge preview to one or more computing systems and receiving identification for the one or more purge exemptions from the one or more computing systems via the network interface; generating the combined key file for one or more of the relations associated to each purge eligible object; determining whether the combined key file contains a partial share; in response to determining that the combined key file contains at least one partial share, repeating the obtaining, the identifying of related data objects, the identifying of purge exemptions, and the generating; in response to determining that the combined key file does not contain a partial share, generating the final purge list based on the combined key file; identifying, based on the final purge list, one or more account keys from one or more in-scope tables maintained at the one or more computing systems; loading one or more purge keys in a driver table based on the one or more account keys; and joining the one or more in-scope tables maintained at the one or more computing systems with the driver table to purge one or more records of the one or more in-scope tables.

In one or more exemplary implementations, the method further comprises: archiving the purged one or more records of the one or more in-scope tables in a purge archive; loading purge keys in a driver history table; determining whether the purge of the one or more records of the one or more in-scope tables is valid; in response to determining that the purge of the one or more records of the one or more in-scope tables is valid, permanently deleting the purged one or more records from the purge archive; and in response to determining that the purge of the one or more records of the one or more in-scope tables is invalid, executing a rollback of the purged one or more records to the one or more in-scope tables.

In one or more exemplary implementations, the permanently deleting of the purged one or more records from the purge archive is executed based on the driver history table in a process in a process that corresponds to the joining.

In one or more exemplary implementations, the rollback is executed based on the driver history table and the purge archive, and the rollback comprises: generating a rollback object list; identifying one or more rollback keys; extracting data from the purge archive using the one or more rollback keys; merging the extracted archive data to one or more rollback tables; obtaining one or more pre-rollback image copies of the one or more in-scope tables; restoring one or more rollback objects to the one or more in-scope tables; obtaining one or more post-rollback image copies of the one or more in-scope tables; and reconciling rolled back data based on pre-purge information.

In one or more exemplary implementations, the pre-purge information comprises a pre-purge table count, a post-purge table count, and a table count difference between before and after the rollback.

In one or more exemplary implementations, the determining is based on reconciliation data received from the one or more computing systems, the reconciliation data being associated with the purged one or more records of the one or more in-scope tables.

In one or more exemplary implementations, the reconciliation data is triggered to be generated at the one or more computing systems in response to the joining.

In one or more exemplary implementations, the reconciliation data comprises aggregated reconciliation information from respective applications executed at the one or more computing systems.

In one or more exemplary implementations, the determining is executed based on one or more legal hold and retention period criteria for the purged one or more records of the one or more in-scope tables.

In one or more exemplary implementations, the joining comprises, for each of the one or more in-scope tables maintained at the one or more computing systems: an iterative or recursive process that is executed until an end-of-row is determined for a cursor at an input table, said iterative or recursive process comprising: obtaining an identification of the input table; opening the cursor declared with row-set positioning to select one or more records from the input table based on the obtained identification and in accordance with joining to the driver table; fetching the cursor based on a row-set frequency; deleting one or more rows from the input table at a current position of the fetched cursor; performing a commit process on the deleting at the input table; preparing one or more deleted records; and writing the prepared one or more deleted records to one or more backup files; and generating a purge report.

BRIEF DESCRIPTION OF THE DRAWINGS

Various example implementations of this disclosure will be described in detail, with reference to the following figures, wherein.

DETAILED DESCRIPTION

As an overview, the present disclosure generally concerns computer records management and, more specifically, provides a multi-stage technique for identifying appropriate data for disposition, disposing the identified data, and confirming and finalizing a data disposition.

Advantageously, the present disclosure provides a technique that is applicable to large computer network systems covering multiple subsystems, departments, and the like, each with unique data retention requirements. Through the multi-stage approach, the data disposition can be executed accurately with safeguards for reversing any errors. More specifically, the present disclosure provides for segregating the processes for identifying purge eligible entity objects and for purging (or disposing) the associated data, thus allowing for scalability. The identification is executed in a preview stage and, thus, allows for providing feedback on exemptions, if any, prior to purging the relevant data. Furthermore, the purge architecture is flexible to accommodate and support deletion of different operational (or entity, e.g., business) constructs that may be implemented at different departments, subsystems, or the like. The purge process supports bulk purge (mass deletion) but provides a rollback process for selected operational objects (or entity objects, e.g., Business Objects) to be reinstated post purge, if necessary. The purge process provided in the present disclosure is non-intrusive in that records are deleted from one or more tables programmatically in sequence without locking the respective one or more tables, which allows regular operational (or entity-related, e.g., business) processes to execute without any delay in run time. Moreover, the purge process runs in parallel deleting from different tables/files, thus allowing faster end-to-end run times even for higher volumes. The deletion is executed in an appropriate sequence to preserve data integrity & entity relationships.

Figure 1:
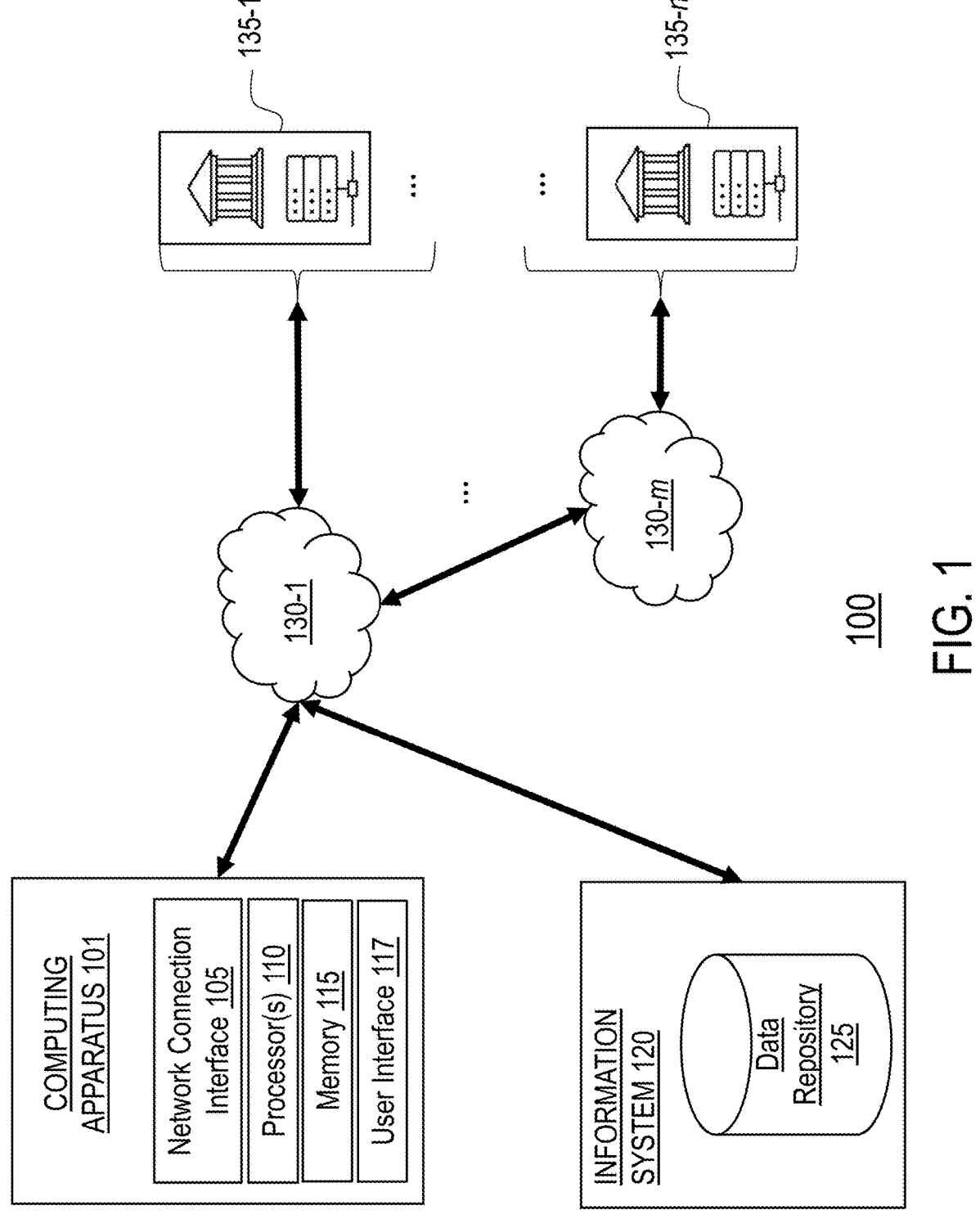
FIG. 1 is a schematic diagram of a system for identifying purge eligible operational objects for purging associated data from one or more computer systems according to one or more exemplary implementations of the present disclosure.

FIG. 1 is a schematic diagram of a system 100 for identifying purge eligible operational objects (or entity objects, e.g., Business Objects) and for purging (or disposing) associated data from one or more computer systems according to one or more exemplary implementations of the present disclosure.

As illustrated in FIG. 1, system 100 comprises at least one computing apparatus 101 that incorporates a network interface connection 105, one or more processors 110, a memory 115, and a user interface 117. Computing apparatus 101 is communicatively coupled to at least one information system 120, via one or more networks 130-1 . . . 130-*m* (m≥1). As illustrated in FIG. 1, information system 120 incorporates at least one data repository 125.

Computing apparatus 101 and information system 120 are communicatively coupled to one or more computing systems 135 (135-1 . . . 135-*n*) (n≥1) via network 130. In one or more exemplary implementations, computing apparatus 101, information system 120, and computing system(s) 135 form at least a part of an enterprise computing network with network(s) 130. The enterprise network, including network 130, can be associated with any enterprise, organization, or institution. Computing apparatus 101 and/or information system 120 form at least a part of a computer records management system, or platform, for managing data processed and stored at system(s) 135. In certain embodiments, the functionality of computing apparatus 101 and/or information system 120 can be incorporated in either of these elements as a standalone system or can be incorporated in additional apparatuses, for example, conforming to the configurations of computing apparatus 101 and/or information system 120, that are in communication with network 130.

Networks 130 can comprise the Internet, an intranet network, a local area network, other wireless or other hardwired connection or connections, or a combination of one or more thereof, by which the aforementioned entities can communicate. Communications systems for facilitating network 130 can include hardware (e.g., hardware for wired and/or wireless connections) and/or software, and the communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Computer systems can communicate with other computer systems or devices directly and/or indirectly, e.g., through a data network, such as the Internet, a telephone network, a mobile broadband network (such as a cellular data network), a mesh network, Wi-Fi, WAP, LAN, and/or WAN, to name a few. For example, network(s) 130 can be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"), which are some of the various types of protocols that can be used to facilitate communications among computing apparatus 101, information system 120, and computing system(s) 135. According to one or more exemplary embodiments of the present disclosure, network 130 is comprised of switches (not shown), routers (not shown), and other computing devices (not shown) for facilitating communications and data exchanges among computing apparatus 101, information system 120, and computing system(s) 135, while conforming to the above-described connections and protocols as understood by those of ordinary skill in the art.

Computing apparatus 101 can be a server apparatus, desktop computer, or the like. Network connection interface 105 can use any of the previously mentioned exemplary communications protocols. According to one or more exemplary implementations, network connection interface 105 comprises one or more universal serial bus ("USB") ports, one or more Ethernet or broadband ports, and/or any other type of hardwire access port to communicate with networks 130 and, accordingly, information system 120, and computing system(s) 135.

Processor(s) 110 can include any suitable processing circuitry capable of controlling operations and functionality of computing apparatus 101, as well as facilitating communications between various components within computing apparatus 101. In some embodiments, processor(s) 110 can include a central processing unit ("CPU"), a graphic processing unit ("GPU"), one or more microprocessors, a digital signal processor, or any other type of processor, or any combination thereof. In some embodiments, the functionality of processor(s) 110 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 110 can include its own local memory, which can store program systems, program data, and/or one or more operating systems.

Memory 115 can include one or more types of storage mediums, such as any volatile or non-volatile memory, or any removable or non-removable memory implemented in any suitable manner to store data for computing apparatus 101. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 115 can be implemented as computer-readable storage media ("CRSM"), which can be any available physical media accessible by processor(s) 110 to execute one or more instructions stored within memory 115. According to one or more exemplary implementations, one or more applications corresponding to the risky entity identification process steps, transaction flagging process steps, and similar transaction screening process steps described in further detail below are stored in memory 115 and executed by processor(s) 110.

As described above, information system 120 incorporates one or more data repositories 125, which embody servers and corresponding storage media for storing data for enterprise network 130 as will be understood by one of ordinary skill in the art. Exemplary storage media for data repository 125 correspond to those described above with respect to memory 115, which will not be repeated here. According to one or more exemplary implementations, information system 120 incorporates one or more databases in data repository 125, which incorporate a relational database management system (RDBMS) that employs the Structured Query Language (SQL) standard as its command-and-control language. In certain embodiments, information system 120 can be comprised of one or more database servers that support Oracle SQL, NoSQL, NewSQL, PostgreSQL, MySQL, Microsoft SQL Server, Sybase ASE, SAP HANA, DB2, and the like. Information system 120 incorporates a network connection interface (not shown) for communications with network 130 and exemplary implements of which can include those described above with respect to network connection interface 105, which will not be repeated here.

Computing system(s) 135 incorporates one or more server apparatuses, computers, or the like, conforming to the configurations of computing apparatus 101 and/or information system 120 for processing and managing operations and/or transactions associated with enterprise network 130, which can include operations and/or transactions associated with any enterprise, organization, or institution, to name a few.

Figure 2:
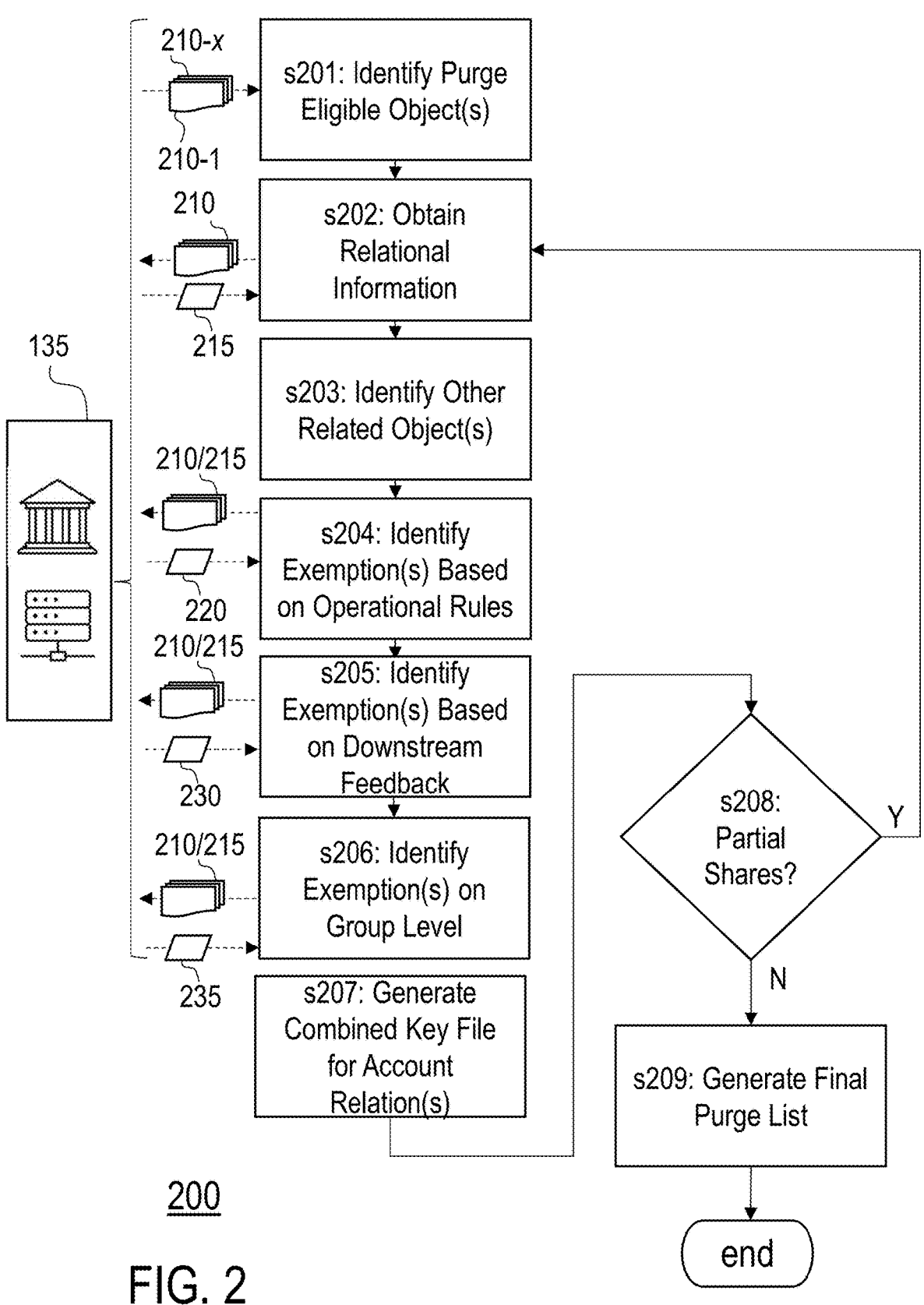
FIG. 2 is a flow diagram of a purge eligible object identification process of the system of FIG. 1 in accordance with one or more exemplary implementations of the present disclosure.

FIG. 2 is a flow diagram of a purge eligible object identification (or purge preview) process 200 in accordance with one or more exemplary implementations of the present disclosure.

As illustrated in FIG. 2, process 200 initiates with step s201, where computing apparatus 101 (and/or information system 120) identifies operational object(s) (or entity object(s), e.g., Business Object(s)) that are eligible to be purged. In one or more exemplary implementations, computing apparatus 101 (and/or information system 120)

obtains data identifying one or more purge eligible operational objects (or entity objects, e.g., Business Objects) 210-1 . . . 210-x (x≥1) from computing system(s) 135. Object(s) 210 can incorporate a record, a list, a file, or the like. In one or more exemplary implementations, process 200 is executed at computing apparatus 101 (and/or information system 120) on a recurrent, or iterative, basis using, for example, an application programming interface (API) to access computing system(s) 135 for obtaining (or retrieving) the object(s) 210. In one or more exemplary embodiments, process 200 is executed on a periodic loop, for example, every Thursday before the third Saturday of the month, or the like. In embodiments, the execution timing of process 200 is configurable and can be initiated, for example, by a notification from computing system(s) 135. Object(s) 210 that are eligible for purging can be maintained at one or more computing and/or storage devices (not shown) at computing system(s) 135 and can included data elements flagged as being associated with entities removed from operations, terminated accounts, or the like, at computing system(s) 135. Object(s) 210 can also include data elements for which a data retention period has expired. In certain embodiments, computing apparatus 101 (and/or information system 120) can incorporate features of computing system(s) 135 to maintain the relevant data associated with the one or more purge eligible operational objects (or entity objects, e.g., Business Objects) 210. Thus, the exchanges with computing system(s) 135 illustrated in FIGS. 3-5 and described below can include exchanges among components of computing apparatus 101 (and/or information system 120).

Next, at step s202, computing apparatus 101 (and/or information system 120) obtains relational information 215 for the identified object(s) 210 from computing system(s) 135. In embodiments, relational information can be incorporated in a record, a list, a file, or the like.

At step s203, computing apparatus 101 (and/or information system 120) identifies one or more other related objects (e.g., Business Objects) based on the relational information obtained at step s202. In embodiments, the other related objects can be object(s) associated with object(s) 210, for example, through associations with an account, a client, an entity, or the like. In one or more exemplary implementations, computing apparatus 101 (and/or information system 120) checks the related Business Objects and associations to other Business Objects and selects only the unique objects that along with their associations is completely eligible for purge.

Next, at step s204, computing apparatus 101 (and/or information system 120) identifies one or more exemptions from purging based on operational (e.g., business) rules. In one or more exemplary implementations, exemption information 220 is obtained from computing system(s) 135 based on object(s) 210 and/or relational information 215. In some embodiments, object(s) 210 and/or one or more other related objects based on the relational information 215 is forwarded to impacted application(s) maintained at computing system(s) 135 for relevant operational rules that can implicate any exemptions. For example, an object 210 can be forwarded to one or more operational groups associated with an impacted application(s) for confirmation on operational rules (e.g., data retention period) for any exemptions from data purging. As an example, accounts with active transactions within a threshold period, such as within the previous 10 years, can be exempted from data purging. In some embodiments, exemption information 220 can be embodied in a response message, a list, or the like, from computing system(s) 135 indicating any data elements that are exempt from purging. In certain embodiments, exemption information 220 can include information related to qualified-transaction-based exemptions impacting account valuations (client restitutions), financial advisor revenues (insurance and annuities trails), account(s) with ongoing class actions and/or litigations, or the like.

At step s205, computing apparatus 101 (and/or information system 120) determines identifies one or more exemptions from purging based on downstream feedback. In one or more exemplary implementations, exemption information 230 is obtained from computing system(s) 135 based on object(s) 210 and/or relational information 215. In some embodiments, data identifying object(s) 210 and/or one or more other related objects based on the relational information 215 is forwarded to impacted application(s) maintained at computing system(s) 135 for feedback on any exemptions. For example, an object 210 can be forwarded to one or more users or agents of the impacted application(s) for feedback on any exemptions from data purging. In some embodiments, exemption information 230 can be embodied in a response message, a list, or the like, from computing system(s) 135 indicating any data elements that are exempt from purging. In certain embodiments, exemption information 230 can include information related to banking transactional (credits and debits) data applicable for modeling and forecasting, for example, for Federal Reserve Comprehensive Capital Analysis and Review (CCAR) modeling and reporting, wealth management (WM) strategic (strats) modeling, or the like. In some embodiments, exemption information 230 can indicate region data (e.g., zip codes) while PII can be purged to retain relevant and anonymized modeling data. Thus, account-specific information can be purged while retaining anonymized transactional data for data modeling, risk modeling, finance modeling, stress testing, estimations, and the like, which is especially advantageous for banking applications that are sensitive to market changes.

Next, at step s206, computing apparatus 101 (and/or information system 120) determines identifies one or more exemptions from purging on a group (e.g., division, branch, or the like) level. In one or more exemplary implementations, group level exemption information 235 is obtained from computing system(s) 135 based on object(s) 210 and/or relational information 215. In some embodiments, data identifying object(s) 210 and/or one or more other related objects based on the relational information 215 is forwarded to impacted group(s) maintained at computing system(s) 135 for feedback on any exemptions. For example, an object 210 can be forwarded to one or more users or agents of the impacted group(s) for feedback on any exemptions from data purging. In some embodiments, exemption information 235 can be embodied in a response message, a list, or the like, from computing system(s) 135 indicating any data elements that are exempt from purging. In certain embodiments, exemption information 235 can be similar to exemption information 230 but on an organizational group level and can include information related to banking transactional (credits and debits) data applicable for modeling and forecasting, for example, for Federal Reserve Comprehensive Capital Analysis and Review (CCAR) modeling and reporting, wealth management (WM) strategic (strats) modeling, or the like. In some embodiments, exemption information 230 can indicate region data (e.g., zip codes) while PII can be purged to retain relevant and anonymized modeling data. Thus, account-specific information can be purged while retaining anonymized transactional data for data modeling, risk modeling, finance modeling, stress testing, estimations, and the like, which is especially advantageous for banking applications that are sensitive to market changes.

In some embodiments, the object(s) 210 and/or one or more other related objects based on the relational information 215 that is forwarded at step s204, s205, and/or step s206 can correspond in format to a driver table described in the following at step s303 of process 300—for example, in the form of a preview driver file for previewing a data purge.

With relational information 215, exemption information 230, and exemption information 235, computing apparatus 101 (and/or information system 120), at step S207, generates a combined key file for one or more account (or object) relations associated with each purge eligible object. In one or more exemplary implementations of the present disclosure, a key or key file as used herein refers to a database key, as would be understood by one of ordinary skill in the art. Accordingly, data elements (e.g., records, or the like) that are related to each purge eligible object are identified in the combined key file. In one or more exemplary implementations, the combined key file corresponds in format to a driver table used in purge process 300 containing purge (or deletion) keys to be used during a purge. The keys are extracted for all in-scope tables/files maintained at computing apparatus 101, information system 120, and/or computing system(s) 135.

Next, at step s208, computing apparatus 101 (and/or information system 120) determines whether the combined key file contains any partial shares among the data elements associated to the purge eligible objects. A partial share indicates a data element (e.g., a record, or the like) that is associated with multiple objects (e.g., Business Objects), which can include purge eligible and non-purge eligible objects, respectively. Thus, in certain embodiments, when one or more account, data element, or the like, includes a partial share with at least one non-purge eligible object, such as a non-purge eligible account or the like, a determination is needed on exemptions associated with the at least one non-purge eligible object.

In response to determining that the combined key file contains one or more partial shares ("Y"), computing apparatus 101 (and/or information system 120) returns to step s202 to loop process 200, obtain and/or confirm exemptions (e.g., at steps s204-s206), and clarify data elements to be purged so that partial shares are not flagged for purging.

In response to determining that the combined key file does not contain any partial shares ("N"), computing apparatus 101 (and/or information system 120) concludes process s200 by generating a final purge list based on the combined key file at step s209. In one or more exemplary implementations, the generated final purge list is stored at computing apparatus 101 (and/or information system 120) for executing a data purge process on computing system(s) 135.

Advantageously, the multiple looping facilitated at steps s208 ensures that only accounts, data elements, or the like, that are associated with all purge eligible objects would be included in the final purge list and that no accounts or data elements are orphaned, where certain accounts or data elements are retained while their associated accounts or data elements are purged. Accordingly, all purge eligible accounts associated with one another, for example, any parent and child accounts, would be purged simultaneously and none such accounts would be orphaned. Moreover, such data curation is executed centrally FIG. 3A and FIG. 3B together form a flow diagram of a data purge process 300 (300a and 300b in these figures together forming process 300 via connections at reference points 3b-1 and 3b-2) in accordance with one or more exemplary implementations of the present disclosure. As described above, purge preview process 200 is executed a period prior to the execution data purge process 300. In one or more exemplary implementations of the present disclosure, process 300 is executed every third Saturday of each month and purge preview process 200 is executed the Thursday before every third Saturday of each month. In embodiments, the period of executing processes 200 and 300 and the delay between these processes can be adjusted.

Figure 3A:
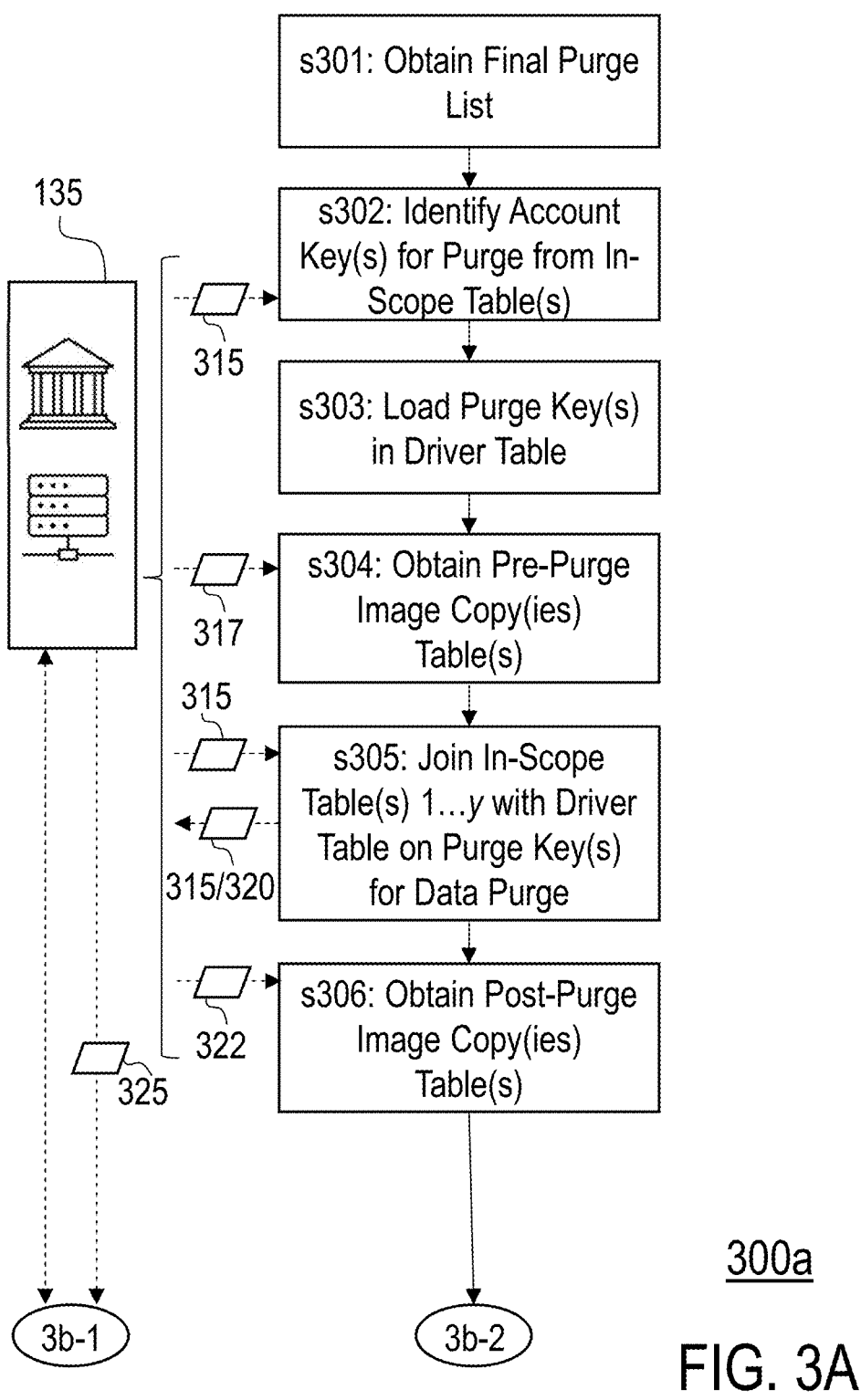
FIGS. 3A and 3B form a flow diagram of a data purge process of the system of FIG. 1 in accordance with one or more exemplary implementations of the present disclosure.

As illustrated in FIG. 3A, process 300 (300a) initiates with step s301, where computing apparatus 101 (and/or information system 120) obtains the final purge list that is generated at process 200.

Next, at step s302, computing apparatus 101 (and/or information system 120) identifies one or more account (or entity) keys for purging data from in-scope tables that are maintained at computing system(s) 135. In one or exemplary implementations, computing apparatus 101 (and/or information system 120) obtains one or more identifications 315 for in-scope tables of computing system(s) 135.

Once the purge key(s) are identified, at step s303, computing apparatus 101 (and/or information system 120) loads the purge key(s) in a driver table 320 adapted for purging data at computing system(s) 135.

Next, at step s304, computing apparatus 101 (and/or information system 120) obtains one or more pre-purge image copies 317 of target (in-scope) table(s).

Computing apparatus 101 (and/or information system 120) then, at step s305, joins the driver table 320 to in-scope tables 1 . . . y (y≥1) for purging data therefrom. In one or more exemplary implementations, the joining of the driver table 320 to the in-scope tables 1 . . . y is based on one or more identifications 315 from computing system(s) 135.

Figure 4:
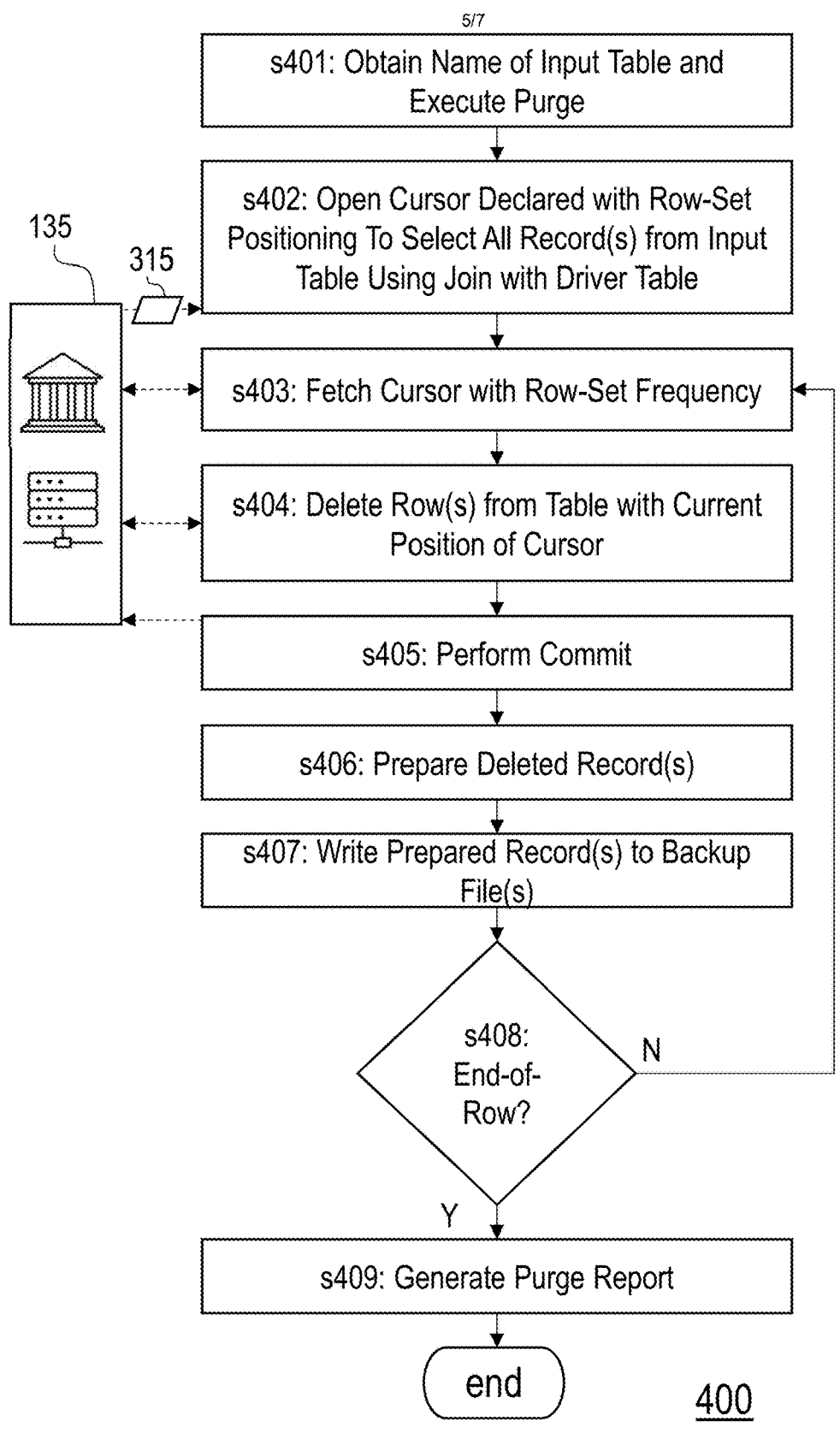
FIG. 4 is a flow diagram of a table data purge process corresponding to the process of FIG. 3 in accordance with one or more exemplary implementations of the present disclosure.

FIG. 4 is a flow diagram of a table data purge process 400 corresponding to step S305 of process 300 in accordance with one or more exemplary implementations of the present disclosure.

As illustrated in FIG. 4, process 400 initiates with step s401, where computing apparatus 101 (and/or information system 120) obtains the name of an input table (e.g., in-scope table 1 . . . y) maintained at computing system(s) 135, for example, included in identification(s) 315, to execute the data purge. Accordingly, prepared records are created for each input table (e.g., in-scope table 1 . . . y).

Next, at step s402, computing apparatus 101 (and/or information system 120) opens a cursor declaring a row-set positioning to select all record(s) from the input table based on joining to driver table 320, which contains the purge key(s). In one or more exemplary implementations, the input table is maintained at computing system(s) 135 and accessed at computing apparatus 101 (and/or information system 120).

Accordingly, computing apparatus 101 (and/or information system 120), at step s403, executes a fetch on the cursor based on a row-set frequency. In one or more exemplary implementations, the row-set frequency is about 5000. In certain embodiments, the row-set frequency is configurable based on the size of the input table. In certain embodiments, the cursor row set can be configured based on the target application suitability and architecture.

Next, at step s404, computing apparatus 101 (and/or information system 120) deletes one or more rows from the input table at a current position of the fetched cursor.

Computing apparatus 101 (and/or information system 120) then, at step s405, performs a commit process on the deletion at the input table.

Next, computing apparatus 101 (and/or information system 120), at step S406, prepares a copy of the deleted record(s) and, at step s407, writes the prepared record(s) to one or more backup files. In one or more exemplary implementations, the backup file(s) is maintained at computing apparatus 101 (and/or information system 120) for a potential rollback, for example, in the event of an error.

Process 400 is looped until all rows of an input table selected at step s402 are processed. Accordingly, at step s408, computing apparatus 101 (and/or information system 120) determines whether the cursor is at an end-of-row of the input table.

In response to determining that the cursor is not at the end-of-row ("N"), computing apparatus 101 (and/or information system 120) returns to step s403 to loop process 400 and to purge data in a next iteration from the input table. In one or more exemplary implementations, computing apparatus 101 (and/or information system 120) fetches the cursor again at the position of a previous data purge iteration at the input table.

In response to determining that the cursor is at the end-of-row ("Y"), computing apparatus 101 (and/or information system 120) concludes process 400 by generating a purge report at step S409.

In one or more exemplary implementations, process 400 is executed at computing apparatus 101 (and/or information system 120) on a recurrent, or iterative, basis through in-scope table(s) 1 . . . y at step s304 of process 300. In some embodiments, multiple iterations or instances of process 400 can be executed in parallel, for example, across multiple applications, iterations, copies, instances, variants, versions, or the like, associated with in-scope table(s) 1 . . . y at computing system(s) 135. For example, process 300 can be executed in (e.g., daily) batches at respective impacted applications, which are executed at computing apparatus 101, information system 120, and/or computing system(s) 135, upon completion of an iteration on a main or master table. In certain embodiments, data is purged from child tables followed by parent tables.

In some embodiments, at least a portion of step s305 of process 300 and/or process 400 can be executed at computing system(s) 135 in response to instructions from computing apparatus 101 (and/or information system 120). Thus, computing apparatus 101 (and/or information system 120) can form a centralized data purge management system to purge stale data from distributed computing systems 135, such as stale account data, client data, PII, or the like.

Figure 6:
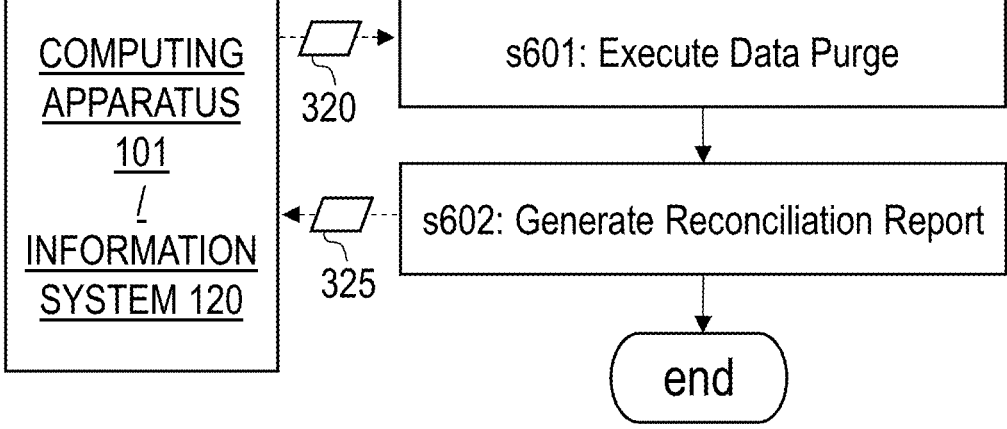
FIG. 6 is a flow diagram of a data purge and reconciliation report generation process in accordance with one or more exemplary implementations of the present disclosure.

In response to executing data purge according to step s305 and/or process 400, computing system(s) 135 generates reconciliation data 325 corresponding to the purged data and forwards the generated reconciliation data 325 to computing apparatus 101 (and/or information system 120), as illustrated in FIG. 6 and described in further detail below according to one or more exemplary implementations of the present disclosure. In some embodiments, reconciliation data 325 can comprise a text and/or spreadsheet file indicating all data purged at computing system(s) 135 according to step s305 and/or process 400. Reconciliation data 325 can be forwarded to one or more of computing apparatus 101, information system 120, and computing system(s) 135. In certain embodiments, prior reconciliation data can be archived at computing apparatus 101, information system 120, and/or computing system(s) 135 upon receiving reconciliation data 325 for a current data purge.

Returning to FIG. 3A, in response to completing the data purge at step S305, computing apparatus 101 (and/or information system 120) proceeds to step s306 and obtains post-purge image copies 322 of in-scope tables 1 . . . y (y≥1) that are joined with driver table 320 at step S305. The pre-purge and post-purge image copies 317 and 322 obtained at steps s304 and s306 are usable for detecting and reversing any purge errors at step s305 and/or process 400.

Figure 3B:
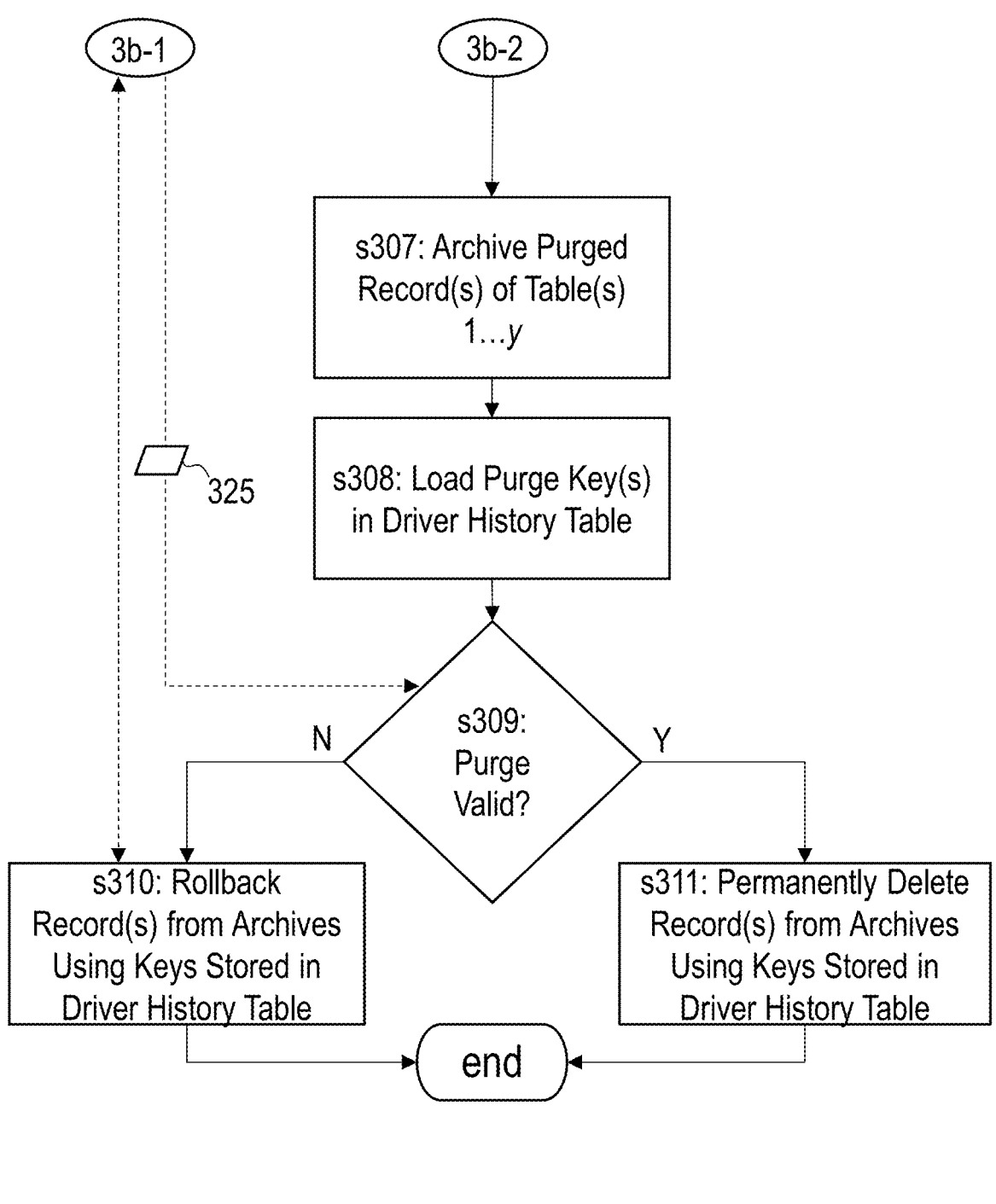

Referring now to FIG. 3B, process 300 (300*b*) proceeds, next, to step s307, where computing apparatus 101 (and/or information system 120).archives the purged record(s) at table(s) 1 . . . y. In one or more exemplary implementations, the archived record(s) is generated based on the backup file(s) written at step s407 of process 400 and securely maintained at computing apparatus 101 (and/or information system 120) for a potential rollback, for example, in the event of an error.

Next, at step s308, computing apparatus 101 (and/or information system 120) loads the purge key(s) used to execute the data purge in a driver history table, which maintains a historical record of past data purges at process 300 and corresponds to the driver tables and the purge key(s) loaded at step s303 for such past data purges.

Computing apparatus 101 (and/or information system 120) then, at step s309, determines whether the completed data purge is valid. In one or more exemplary implementations, the determination at step s309 is based on reconciliation data 325 associated with the data purge received from computing system(s) 135. In some embodiments, reconciliation data 325 is triggered to be generated at computing system(s) 135 by computing apparatus 101 (and/or information system 120), for example, as part of the data purge of step s305 and/or process 400. Reconciliation data 325 can include aggregated reconciliation information from respective applications in response to executing a data purge.

In response to determining that the purge not valid or includes at least one error ("N"), process 300 concludes with step s310, where computing apparatus 101 (and/or information system 120) executes a rollback of the purge process by rolling back records from the archive generated at step s307 using the purge key(s) loaded in the driver history table at step s308.

In response to determining that the purge is valid based on the reconciliation data 325 from computing system(s) 135 ("Y"), computing apparatus 101 (and/or information system 120) concludes process 300 with step s311 by permanently deleting the validly purged record(s) from the archive generated at step s307 using the purge key(s) loaded in the driver history table at step s308. In one or more exemplary implementations, the permanently deleting of the purged record(s) from the archive is executed based on the driver history table in a process that corresponds to the joining of step s305.

In some embodiments, steps s309-s311 can be executed on a recurrent, or iterative, basis, or can be triggered by periodic or ad-hoc communications of reconciliation data 325 from computing system(s) 135. In some implementations, the archive generated at step s307 can be maintained until a retention period or criterion/criteria for the underlying data has expired. For example, a periodic (e.g., 30 days, 90 days, 120 days, 240 days, certain weeks, months, or years) confirmation via computing system(s) 135 with a legal entity (e.g., legal department) can be executed to query for retention period(s) and/or legal hold criterion (ia) associated with the archived data and step s311 of permanently deleting the archived data can be executed in response to confirming that such retention period(s) and/or legal hold criterion (ia) has expired. In embodiments, the periodic confirmation and/or the retention period/criterion/criteria can be adjusted based on ongoing settlements to maintain flexibility for purging data to ensure full compliance and support of ongoing litigation. Thus, step s309 of process 300 can include such confirmations and data 325 can incorporate indications for whether archived data can be permanently deleted at step s311 based on retention period(s) and/or legal hold criterion (ia) or data needs to be rolled back at step s310 based on renewed requirements associated with, for example, a legal hold.

Figure 5:
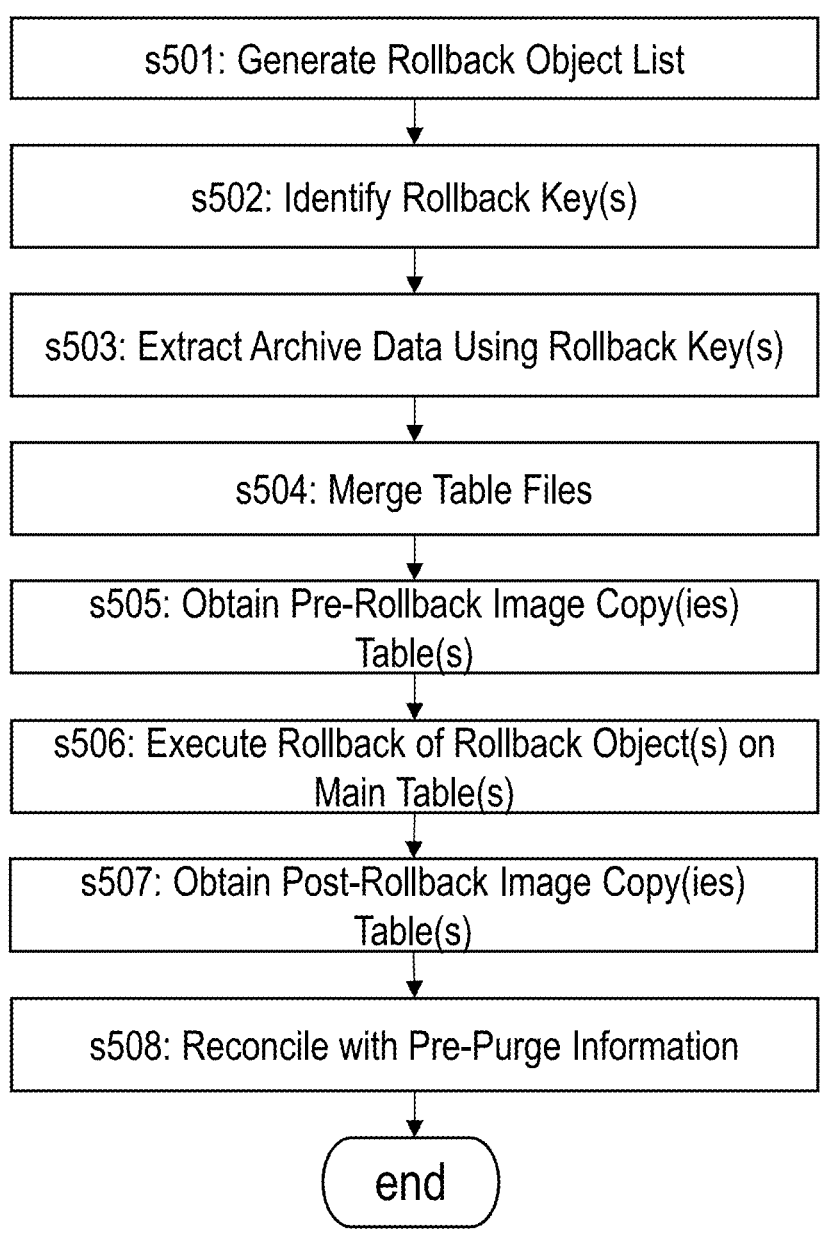
FIG. 5 is a flow diagram of a data rollback process corresponding to the process of FIG. 3 in accordance with one or more exemplary implementations of the present disclosure.

FIG. 5 is a flow diagram of a data rollback process 500 corresponding to step S310 of process 300 in accordance with one or more exemplary implementations of the present disclosure.

As illustrated in FIG. 5, process 500 initiates with step s501, where computing apparatus 101 (and/or information system 120) generates a rollback object list. In one or more exemplary implementations, the rollback object list is generated based on the driver history table and in response to an identified need for rolling back purged data, for example, at step s308 of process 300. In some embodiments, the rollback object list can include one or more objects (e.g., account) (object(s) 210) to be reinstated and can correspond in format to a purge list, for example, generated at step s209 and obtained at step s301. The one or more objects (210) can be rolled back to meet legal and/or business requirements.

Next, at step s502, computing apparatus 101 (and/or information system 120) identifies one or more rollback keys for the object(s) (210) to be reinstated based on the rollback object list generated at step s501. In one or more exemplary implementations, the rollback key(s) are identified from the purge key(s) loaded to the driver history table at step s306 of process 300. Thus, the rollback key(s) corresponds to the data purged based on the purge key(s) identified at step s302 and loaded to the driver table at step s303 of process 300 for the object(s) 210 to be reinstated.

Computing apparatus 101 (and/or information system 120) then, at steps s503, extracts data from the archive using the rollback key(s) identified at step S502. In one or more exemplary implementations, the data is obtained from the archive that is generated at step s305 of process 300 when the object(s) 210 to be reinstated was previously purged. In correspondence with the purge key(s) used to purge the object(s) 210 and loaded to the driver history table at step s306 of process 300, the rollback key(s) identified at step s502 is used to extract data from the archive to generate one or more rollback files and/or tables.

Next, at step s504, computing apparatus 101 (and/or information system 120) merges the extracted archive data to one or more rollback tables, which, in some embodiments, can correspond in format to the driver table used to purge the data associated with the object(s) 210 to be reinstated. In one or more exemplary implementations, plural rollback files and/or tables are merged, for referential integrity, to create one rollback file per application for the object(s) 210 to be reinstated. For example, the object(s) to be reinstated can be associated with multiple applications at computing system(s) 135, computing apparatus 101, and/or information system 120.

Computing apparatus 101 (and/or information system 120) then, at step S505, obtains a pre-rollback image for each of one or more in-scope (or affected) tables to which purged data is to be rolled back.

Next, at step s506, computing apparatus 101 (and/or information system 120) executes rollback of (or reinstates or restores) one or more rollback objects to corresponding one or more main (or master) table(s). In one or more exemplary implementations, the main table(s) corresponds to the in-scope table(s) from which data is purged and to which the purged data is to be rollbacked, for example, based on the determination at step s307 of process 300. In some embodiments, computing system(s) 135 can incorporate multiple copies, instances, variants, versions, or the like, of the affected table(s), for example, for serving multiple applications at computing system(s) 135, computing apparatus 101, and/or information system 120. Accordingly, the main in-scope table(s) can be rolled back at step s506. In some embodiments, step s506 can include serial and/or parallel processes of rolling back the data to the multiple copies, instances, variants, versions, or the like, of the affected table(s), including the main table(s)—for example, at the multiple applications using respective rollback files created at step S504.

Computing apparatus 101 (and/or information system 120) then, at step s507, obtains a post-rollback image for each of the one or more affected tables.

Next, computing apparatus 101 (and/or information system 120) concludes process 500 at step s508 by reconciling the rolled back data based on pre-purge information. In one or more exemplary implementations, the reconciliation information includes a pre-rollback table count, a post-rollback table count, and a table count difference between before and after an execution of process 500.

As described before, in some embodiments, at least a portion of step s305 of process 300 and/or process 400 can be executed at computing system(s) 135 in response to instructions from computing apparatus 101 (and/or information system 120). Thus, computing apparatus 101 (and/or information system 120) can form a centralized data purge management system to purge stale data from distributed computing systems 135, such as stale account data, client data, PII, or the like.

FIG. 6 is a flow diagram of a data purge and reconciliation report generation process 600 corresponding to steps s305 and s309 of process 300 in accordance with one or more exemplary implementations of the present disclosure.

As illustrated in FIG. 6, process 600 initiates with step s601, where computing system(s) 135 executes data purge in response to computing apparatus 101 (and/or information system 120), including receiving driver table 320. In one or more exemplary implementations, the data purge of step s601 corresponds to step s305 of process 300 and/or process 400.

Next, at step s602, in response to executing data purge according to step s305 of process 300 and/or process 400, computing system(s) 135 generates reconciliation data 325 corresponding to the purged data and forwards the generated reconciliation data 325 to computing apparatus 101 (and/or information system 120). In some embodiments, reconciliation data 325 can comprise a text and/or spreadsheet file indicating all data purged at computing system(s) 135 according to step s305 and/or process 400. Reconciliation data 325 can be forwarded to one or more of computing apparatus 101, information system 120, and computing system(s) 135. In certain embodiments, prior reconciliation data can be archived at computing apparatus 101, information system 120, and/or computing system(s) 135 upon receiving reconciliation data 325 for a current data purge.

EXAMPLES

Example 1

Table 1 below is an example of a purge preview report that is generated after a purge preview is executed at an application, for example, process 200 executed at one or more of computing apparatus 101, information system 120, and computing system(s) 135 according to one or more exemplary implementations of the present disclosure.

TABLE 1

| Business Object Purged Preview Stats (Summary) | |
| --- | --- |
| Preview Driver file received date: | MM/DD/YYYY |
| Total Business Object 1 sent for preview: | xxxxxxx |
| Business Object 1 found in <system> during preview: | yyyyyyy |
| Business Object 1 excluded during preview: | zzzzzzzz |
| Count of Purge eligible Business Object 1 post preview: | nnnnnn |

The "Total Business Object 1 sent for preview" element indicates a number of instances, data elements, or the like, that are associated with "Business Object 1" in a preview driver file, which corresponds to object(s) 210 and/or relational information 215 of steps s204, s205, and/or s206 of process 200 illustrated in FIG. 2 and described above.

The "Business Object 1 found in <system> during preview" element indicates a number of instances, data elements, or the like, that are associated with "Business Object 1" in the particular application that receives the preview driver file and generates the purge preview report. This element is determined and generated based on a total population of "Business Object 1" that is present in the preview driver file.

Example 2

Table 2 below is an example of a reconciliation report that is generated after a data purge is executed at an application, for example, process 300 executed at one or more of computing apparatus 101, information system 120, and computing system(s) 135. In one or more exemplary implementations of the present disclosure, Table 2 is included in reconciliation data 325 corresponding to steps s305 and s309 of process 300 and process 600.

TABLE 2

| Business Object Purged Stats (Summary) | |
| --- | --- |
| Driver file received date: | MM/DD/YYYY |
| Total Business Object 1 in Driver file: | xxxxxxx |
| Business Object 1 found in <system>: | yyyyyyy |
| Purge eligible Business Object 1 in <system>: | zzzzzzzz |
| Actual Business Object 1 Purged: | nnnnnn |

The "Total Business Object 1 sent Driver file" element indicates a number of instances, data elements, or the like, that are associated with "Business Object 1" in a final driver file, which corresponds to the driver table 320 of steps s303 and s304 of process 300 illustrated in FIG. 3 and described above.

The "Business Object 1 found in <system>" element indicates a number of instances, data elements, or the like, that are associated with "Business Object 1" in the particular application at which a data purge is executed and which generates the reconciliation report. This element is determined and generated based on a total population of "Business Object 1" that is present in the final driver file.

Example 3

Table 3 below is an example of an aggregated reconciliation report that is generated after a data purge is executed at all applications, for example, process 300 executed at one or more of computing apparatus 101, information system 120, and computing system(s) 135. In one or more exemplary implementations of the present disclosure, Table 3 is an aggregation of reconciliation data 325—for example, in the form of Table 2—corresponding to steps s305 and s309 of process 300 and process 600. In one or more exemplary implementations, Table 3 results from computing apparatus 101, information system 120, and/or computing system(s) 135 aggregating reconciliation data 325 at step s309.

TABLE 3

| | | Table/File Level Details | | | | | |
|---|---|---|---|---|---|---|---|
| No. | Table Name | Expected Count of Records to be Purged | Total Count of Records (Before) | Total Count of Records (After) | Actual Records Purged (Purge: Col E-Col F) | Count Difference Expected vs. Actual (Col. D-Col. G) | Comments (In case there exists Count Difference) |
| 1 | | | | | | | |
| ... | | | | | | | |
| y | | | | | | | |

As illustrated above, Table 3 includes a tabular record, for each of table(s) 1 . . . y at the respective application(s), of an expected count of records to be purged from the table, a total count of records in the table before a data purge, a total count of records in the table after a data purge, a number of actual records purged, a count difference between expected and actual records after a data purge, and comments.

In one or more exemplary implementations of the present disclosure, all in-scope applications create reconciliation reports post execution of purge process 300. These reports, which can include Tables 2 and/or 3, are collected and stored centrally in archive facilitating audit or compliance reporting. Advantageously, the reconciliation data of tables 2 and 3 can be used to verify the validity of a purge process, for example, at step s309 of process 300, as well as to reconcile and verify a rollback process, for example, at step s508 of process 500.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-*b*). Description of elements with references to the base reference numerals (e.g., 210) also refer to all specific examples with such letter suffixes (e.g., 210-*b*), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a." "an," and "the" are intended to include the plural forms as well, unless the context clearly indicates otherwise. It will be further understood that the terms "contains", "containing", "includes", "including." "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A system, comprising:

a network interface;

a processor; and a memory operatively connected to the processor and having stored thereon machine-readable instructions that, when executed, cause the processor to:

identify one or more purge eligible data objects;

generate a final purge list based on the one or more purge eligible data objects in an iterative or recursive manner until a combined database key file associating relations to the one or more purge eligible data objects contains no partial shares, said generating comprising:

obtaining relational information associated with the one or more purge eligible data objects;

identifying one or more related data objects based on the relational information;

identifying one or more purge exemptions associated with the one or more purge eligible data objects by forwarding, via the network interface, a purge preview to one or more computing systems and receiving identification for the one or more purge exemptions from the one or more computing systems via the network interface;

generating the combined database key file for one or more of the relations associated to each purge eligible object;

determining whether the combined database key file contains a partial share;

in response to determining that the combined database key file contains at least one partial share, repeating the obtaining, the identifying of related data objects, the identifying of purge exemptions, the generating, and the determining; and in response to determining that the combined database key file does not contain a partial share, generating the final purge list based on the combined database key file;

identify, based on the final purge list, one or more account database keys from one or more in-scope tables maintained at the one or more computing systems;

load one or more purge database keys in a driver table based on the one or more account database keys; and join the one or more in-scope tables maintained at the one or more computing systems with the driver table to purge one or more records of the one or more in-scope tables.

2. The system of claim 1, wherein the memory has stored thereon additional machine-readable instructions that, when executed, cause the processor to:

archive the purged one or more records of the one or more in-scope tables in a purge archive;

load purge database keys in a driver history table;

determine whether the purge of the one or more records of the one or more in-scope tables is valid;

in response to determining that the purge of the one or more records of the one or more in-scope tables is valid, permanently delete the purged one or more records from the purge archive; and in response to determining that the purge of the one or more records of the one or more in-scope tables is invalid, execute a rollback of the purged one or more records to the one or more in-scope tables.

3. The system of claim 2, wherein the permanently deleting of the purged one or more records from the purge archive is executed based on the driver history table in a process in a process that corresponds to the joining.

4. The system of claim 2, wherein the rollback is executed based on the driver history table and the purge archive, and the rollback comprises:

generating a rollback object list;

identifying one or more rollback database keys;

extracting data from the purge archive using the one or more rollback database keys;

merging the extracted archive data to one or more rollback tables;

obtaining one or more pre-rollback image copies of the one or more in-scope tables;

restoring one or more rollback objects to the one or more in-scope tables;

obtaining one or more post-rollback image copies of the one or more in-scope tables; and reconciling rolled back data based on pre-purge information.

5. The system of claim 4, wherein the pre-purge information comprises a pre-purge table count, a post-purge table count, and a table count difference between before and after the rollback.

6. The system of claim 2, wherein the determining is based on reconciliation data received from the one or more computing systems, the reconciliation data being associated with the purged one or more records of the one or more in-scope tables.

7. The system of claim 6, wherein the reconciliation data is triggered to be generated at the one or more computing systems in response to the joining.

8. The system of claim 7, wherein the reconciliation data comprises aggregated reconciliation information from respective applications executed at the one or more computing systems.

9. The system of claim 2, wherein the determining is executed based on one or more legal hold and retention period criteria for retaining the purged one or more records of the one or more in-scope tables in the purge archive.

10. The system of claim 1, wherein the joining comprises, for each of the one or more in-scope tables maintained at the one or more computing systems:

an iterative or recursive process that is executed until an end-of-row is determined for a cursor at an input table, said iterative or recursive process comprising:

obtaining an identification of the input table;

opening the cursor declared with row-set positioning to select one or more records from the input table based on the obtained identification and in accordance with joining to the driver table;

fetching the cursor based on a row-set frequency;

deleting one or more rows from the input table at a current position of the fetched cursor;

performing a commit process on the deleting at the input table;

preparing one or more deleted records;

writing the prepared one or more deleted records to one or more backup files; and generating a purge report.

11. A method, comprising:

identifying, at a computing apparatus, one or more purge eligible data objects;

generating, at the computing apparatus, a final purge list based on the one or more purge eligible data objects in an iterative or recursive manner until a combined database key file associating relations to the one or more purge eligible data objects contains no partial shares, said generating comprising:

obtaining relational information associated with the one or more purge eligible data objects;

identifying one or more related data objects based on the relational information;

identifying one or more purge exemptions associated with the one or more purge eligible data objects by forwarding, via a network interface, a purge preview to one or more computing systems and receiving identification for the one or more purge exemptions from the one or more computing systems via the network interface;

generating the combined database key file for one or more of the relations associated to each purge eligible object;

determining whether the combined database key file contains a partial share;

in response to determining that the combined database key file contains at least one partial share, repeating the obtaining, the identifying of related data objects, the identifying of purge exemptions, the generating, and the determining; and in response to determining that the combined database key file does not contain a partial share, generating the final purge list based on the combined key file;

identifying, based on the final purge list, one or more account database keys from one or more in-scope tables maintained at the one or more computing systems;

loading one or more purge database keys in a driver table based on the one or more account database keys; and joining the one or more in-scope tables maintained at the one or more computing systems with the driver table to purge one or more records of the one or more in-scope tables.

12. The method of claim 11, further comprising:

archiving the purged one or more records of the one or more in-scope tables in a purge archive;

loading purge database keys in a driver history table;

determining whether the purge of the one or more records of the one or more in-scope tables is valid;

in response to determining that the purge of the one or more records of the one or more in-scope tables is valid, permanently deleting the purged one or more records from the purge archive; and in response to determining that the purge of the one or more records of the one or more in-scope tables is invalid, executing a rollback of the purged one or more records to the one or more in-scope tables.

13. The method of claim 12, wherein the permanently deleting of the purged one or more records from the purge archive is executed based on the driver history table in a process in a process that corresponds to the joining.

14. The method of claim 12, wherein the rollback is executed based on the driver history table and the purge archive, and the rollback comprises:

generating a rollback object list;

identifying one or more rollback database keys;

extracting data from the purge archive using the one or more rollback database keys;

merging the extracted archive data to one or more rollback tables;

obtaining one or more pre-rollback image copies of the one or more in-scope tables;

restoring one or more rollback objects to the one or more in-scope tables;

obtaining one or more post-rollback image copies of the one or more in-scope tables; and reconciling rolled back data based on pre-purge information.

15. The method of claim 14, wherein the pre-purge information comprises a pre-purge table count, a post-purge table count, and a table count difference between before and after the rollback.

16. The method of claim 12, wherein the determining is based on reconciliation data received from the one or more computing systems, the reconciliation data being associated with the purged one or more records of the one or more in-scope tables.

17. The method of claim 16, wherein the reconciliation data is triggered to be generated at the one or more computing systems in response to the joining.

18. The method of claim 17, wherein the reconciliation data comprises aggregated reconciliation information from respective applications executed at the one or more computing systems.

19. The method of claim 12, wherein the determining is executed based on one or more legal hold and retention period criteria for retaining the purged one or more records of the one or more in-scope tables in the purge archive.

20. The method of claim 11, wherein the joining comprises, for each of the one or more in-scope tables maintained at the one or more computing systems:

an iterative or recursive process that is executed until an end-of-row is determined for a cursor at an input table, said iterative or recursive process comprising:

obtaining an identification of the input table;

opening the cursor declared with row-set positioning to select one or more records from the input table based on the obtained identification and in accordance with joining to the driver table;

fetching the cursor based on a row-set frequency;

deleting one or more rows from the input table at a current position of the fetched cursor;

performing a commit process on the deleting at the input table;

preparing one or more deleted records;

writing the prepared one or more deleted records to one or more backup files; and generating a purge report.

* * * * *